(12) United States Patent
White et al.

(10) Patent No.: US 6,216,710 B1
(45) Date of Patent: Apr. 17, 2001

(54) METHOD AND APPARATUS FOR REMOVING QUENCH OIL FROM A PERMEABLE METAL PART

(75) Inventors: Scott E. White, Knoxville; Harold E. Winkler, Kingston, both of TN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/245,188

(22) Filed: Feb. 5, 1999

(51) Int. Cl.⁷ ..................................................... B08B 3/02
(52) U.S. Cl. ............................. 134/170; 134/152; 15/304
(58) Field of Search .................................... 134/170, 149, 134/157, 152; 15/304

(56) References Cited

U.S. PATENT DOCUMENTS

| | | | |
|---|---|---|---|
| 2,774,362 | 12/1956 | Nordling | 134/99 |
| 3,608,567 | 9/1971 | Neill, Jr. | 134/58 |
| 3,765,051 | * 10/1973 | Wanat | 134/170 |
| 3,921,248 | 11/1975 | Effenberger et al. | 15/304 |
| 3,998,656 | * 12/1976 | Grotto | 134/157 |
| 4,090,309 | * 5/1978 | Rollins | 15/304 |
| 4,299,245 | 11/1981 | Clapper | 134/140 |
| 4,585,019 | 4/1986 | Jacobson | 134/57 R |
| 4,750,505 | 6/1988 | Inuta et al. | 134/153 |
| 4,808,234 | * 2/1989 | McKay et al. | 15/304 |
| 5,001,805 | 3/1991 | Stouky et al. | 15/302 |
| 5,078,763 | 1/1992 | Blount-Gillette | 55/302 |
| 5,163,486 | 11/1992 | Rogers et al. | 141/89 |
| 5,305,493 | * 4/1994 | Prenn | 15/345 |
| 5,332,448 | * 7/1994 | Phillips | 15/304 |
| 5,339,843 | 8/1994 | Benedict et al. | 134/56 R |
| 5,419,351 | 5/1995 | Ciari | 134/95.2 |
| 5,444,892 | 8/1995 | Ris et al. | 15/304 |
| 5,524,652 | 6/1996 | Neubauer | 134/95.2 |

* cited by examiner

Primary Examiner—Frankie L. Stinson
(74) Attorney, Agent, or Firm—John W. Morrison

(57) ABSTRACT

A method of removing liquid from pores contained in a permeable metal part is disclosed. The part has a tubular construction defining an interior surface and an exterior surface having an upper end opening and a lower end opening at an opposite end thereof. The method includes the step of sealing the upper end opening and the lower end opening of the permeable metal part so as to define an closed interior chamber. The method further includes the steps of injecting a cleaning fluid into the closed interior chamber. The method yet further includes the step of pressurizing the interior chamber with a gas at a pressure sufficient to cause the cleaning fluid to permeate through the pores from the interior surface to the exterior surface. The liquid is forced through the exterior surface and removed from the pores. An apparatus for removing quench oil from a permeable metal part is also disclosed.

1 Claim, 3 Drawing Sheets

METHOD AND APPARATUS FOR REMOVING QUENCH OIL FROM A PERMEABLE METAL PART

TECHNICAL FIELD OF THE INVENTION

The present invention generally relates to a process for manufacturing permeable metal parts, and more specifically to a method and apparatus for removing quench oil from such permeable metal parts.

BACKGROUND OF THE INVENTION

Self lubricating powder metal bearings have been manufactured by the powder metal industry since the 1930's. These bearing are traditionally compacted from bronze metal powder, sintered, and then impregnated with a lubricating oil. A sealed self lubricating bearing releases lubricating oil as the bearing heats from friction, and then absorbs the oil back into the porosity of the bearing after it cools. The advent of copper ferrous alloys in the 1940's allowed the manufacture of self lubricating powder metal bearings which are made of steel, and can be heat treated for high wear and high compressive strength applications. These bearings are compacted from iron copper alloy powders, sintered, heat treated, tempered, and then impregnated with the lubricating oil.

A drawback to self lubricating bearing sleeves that have heretofore been used is that a liquid can became absorbed in the porous powdered metal bearing sleeve during its manufacture prior to impregnating the bearing sleeve with the lubricant. In particular, in order to strengthen the powdered metal bearing sleeve, the bearing sleeve may be quenched in oil during a heat treatment process. While the heat treatment process significantly strengthens the bearing sleeve, the quench oil is absorbed into the pores of the powered metal structure. A drawback to absorbing quench oil into the pores is that the quench oil occupies volume within the pores that would otherwise be impregnated with lubricant.

One method of removing the quench oil is to heat the bearing sleeve in a furnace to combust the quench oil within the pores. However, combusting the quench oil has the drawback of creating smoke and fires within the furnace. The smoke and fire are not only inconvenient, but also releases a significant amount of pollution into the environment. In addition, the combustion of the quench oil within the pores leaves residual combustion products within the pores. These residual combustion products can significantly reduce the volume of the pores. A drawback to the reduced pore volume is that the amount of lubricant that can subsequently be absorbed by the powdered metal bearing sleeve is reduced thereby decreasing the effectiveness of the self lubricating bearing sleeve.

What is needed therefore is a method and apparatus for removing quench oil from a powdered metal bearing sleeve which overcomes the above-mentioned drawbacks.

DISCLOSURE OF THE INVENTION

In accordance with a first aspect of the present invention, there is provided a method of removing liquid from pores contained in a permeable metal part. The part has a tubular construction defining an interior surface and an exterior surface having an upper end opening and a lower end opening at an opposite end thereof. The method includes the step of sealing the upper end opening and the lower end opening of the permeable metal part so as to define an closed interior chamber. The method further includes the steps of injecting a cleaning fluid into the closed interior chamber. The method yet further includes the step of pressurizing the interior chamber with a gas at a pressure sufficient to cause the cleaning fluid to permeate through the pores from the interior surface to the exterior surface. The liquid is forced through the exterior surface and removed from the pores.

In accordance with a second aspect of the present invention, there is provided an apparatus for removing liquid from a permeable metal part. The permeable metal part entraps a quantity of liquid in pores defined therein. The permeable metal part also defines an upper end opening and a lower end opening. The apparatus includes a first sealing member which seals the lower end opening and a second sealing member which seals the upper end opening. The permeable metal part, the first sealing member, and the second sealing member define an closed interior chamber. The apparatus further includes a compressor operable to fill the interior chamber with pressurized gas and an injector operable to inject cleaning fluid into the interior chamber. The injector injects cleaning fluid into the interior chamber. The compressor pressurizes the interior chamber with the pressurized gas. The cleaning fluid is advanced by the pressurized gas from the interior chamber to an exterior of the permeable metal part via the pores so as to remove the entrapped liquid from the pores.

BEST MODE FOR CARRYING OUT THE INVENTION

Figure 1:
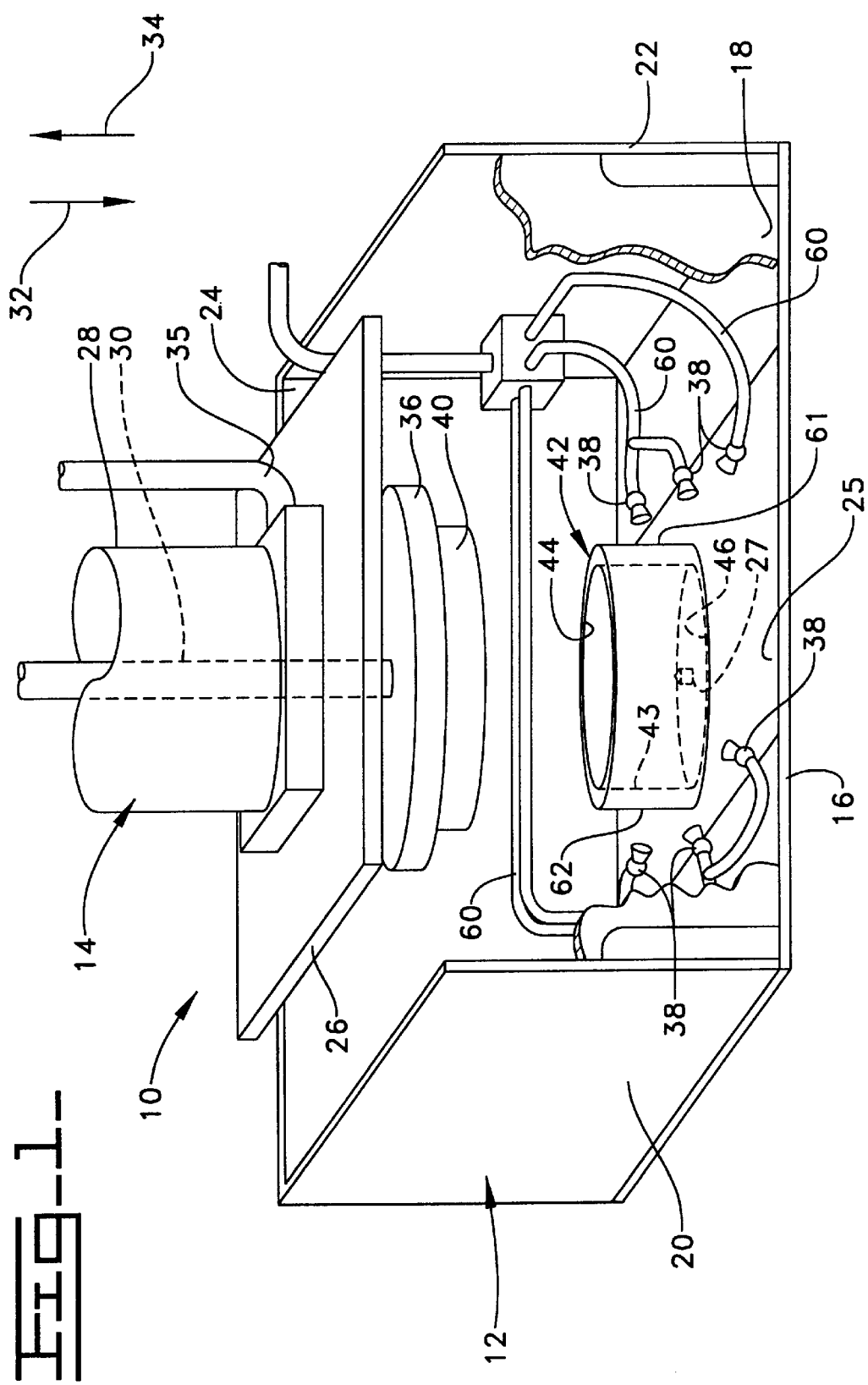
FIG. 1 is a perspective view of the cleaning apparatus which incorporates the features of the present invention therein, with a portion of the front wall being removed for clarity of description.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
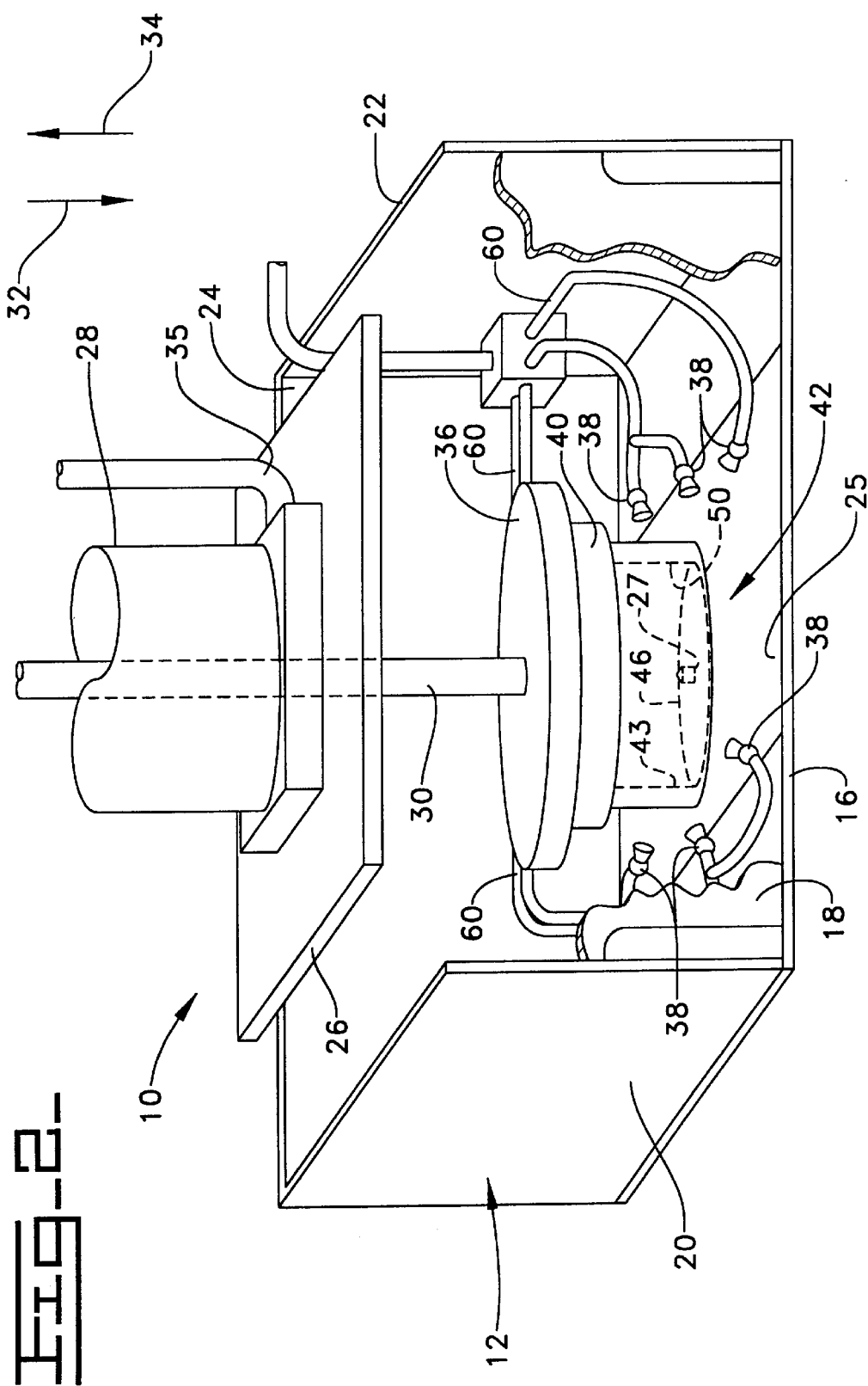
FIG. 2 is a figure similar to FIG. 1, but showing an upper end opening of a bearing sleeve being sealed with a second sealing member.

Referring now to FIGS. 1 and 2, there is shown a cleaning apparatus 10 that incorporates the features of the present invention therein. The cleaning apparatus 10 includes a housing assembly 12 and a piston assembly 14. The housing assembly 12 includes a floor 16, front wall 18, left wall 20, right wall 22, and rear wall 24. The front wall 18 is removable to allow access to the interior of the housing assembly 12. Note, a portion of the front wall 18 has been cut away for clarity of description. The housing assembly 12 is operable to isolate the interior of the cleaning apparatus 10 from the surrounding environment during a cleaning operation.

A first sealing member 25 is positioned on a central portion of the floor 16. The first sealing member 25 is a resilient material that provides a good sealing surface and is wear resistant. An interior nozzle 27 extends through the floor 16 and the first sealing surface 25. The interior nozzle 27 is operable to advance cleaning fluid and air to a central portion of the first sealing surface 25.

The piston assembly 14 includes a platform 26 for supporting other components of the piston assembly 14. The platform 26 is secured in a suitable manner (not shown) to the rear wall 24 of the housing assembly 12. The piston assembly 14 further includes a pneumatic cylinder 28 which houses a piston rod 30. The piston rod 30 is operable by means of a piston (not shown) to move relative to the cylinder 28 in the general direction of arrow 32. In particular, pressurized air is introduced into the cylinder 28 via a pneumatic supply line 35 to urge the piston and piston rod 30 in the general direction of arrow 32.

The piston assembly 14 further includes a support member 36 secured to the bottom of the piston rod 30. The support member 36 extends radially outward from the piston rod 30. The piston assembly 14 further includes a second sealing member 40 secured to the underside of the support member 36. The second sealing member 40 is advanced in the general direction of arrow 32 as the piston rod 30 is moved relative to the cylinder 28. The piston rod 30 moves the second sealing member 40 between an upper position (shown in FIG. 1) and a lower position (shown in FIG. 2).

A permeable metal part, such as a powdered metal bearing sleeve 42, is positioned on the first sealing member 25. The bearing sleeve 42 is of a tubular construction having a cylindrical body with an interior surface 43 which defines an upper end opening 44 and a lower end opening 46. The lower end opening 46 is positioned adjacent to the first sealing surface 25 and encompasses the interior nozzle 27. It should be appreciated that because the bearing sleeve 42 is a permeable metal part, the body of the bearing sleeve 42 is porous and includes a porous structure 48 (shown in FIG. 3). The porous structure 48 includes numerous pores which can entrap a quantity of liquid. During heat treatment of the bearing sleeve 42, the bearing sleeve 42 is quenched by submersing the bearing sleeve 42 in quench oil to enhance the strength of the bearing sleeve 42. An unintended result of the heat treatment operation is that the porous structure 48 of the bearing sleeve 42 absorbs a quantity of quench oil.

As the piston rod 30 moves the second sealing member 40 from the upper position (shown in FIG. 1) to the lower position (shown in FIG. 2) the bearing sleeve 42 is positioned between the first sealing member 25 and the second sealing member 40. The first sealing member 25 seals the lower end opening 46 whereas the second sealing member 40 seals the upper end opening 44. Sealing of the lower end opening 46 and the upper end opening 44 defines a closed interior chamber 50 within the bearing sleeve 42. The interior nozzle 27 is in fluid communication with the interior chamber 50.

Figure 3:
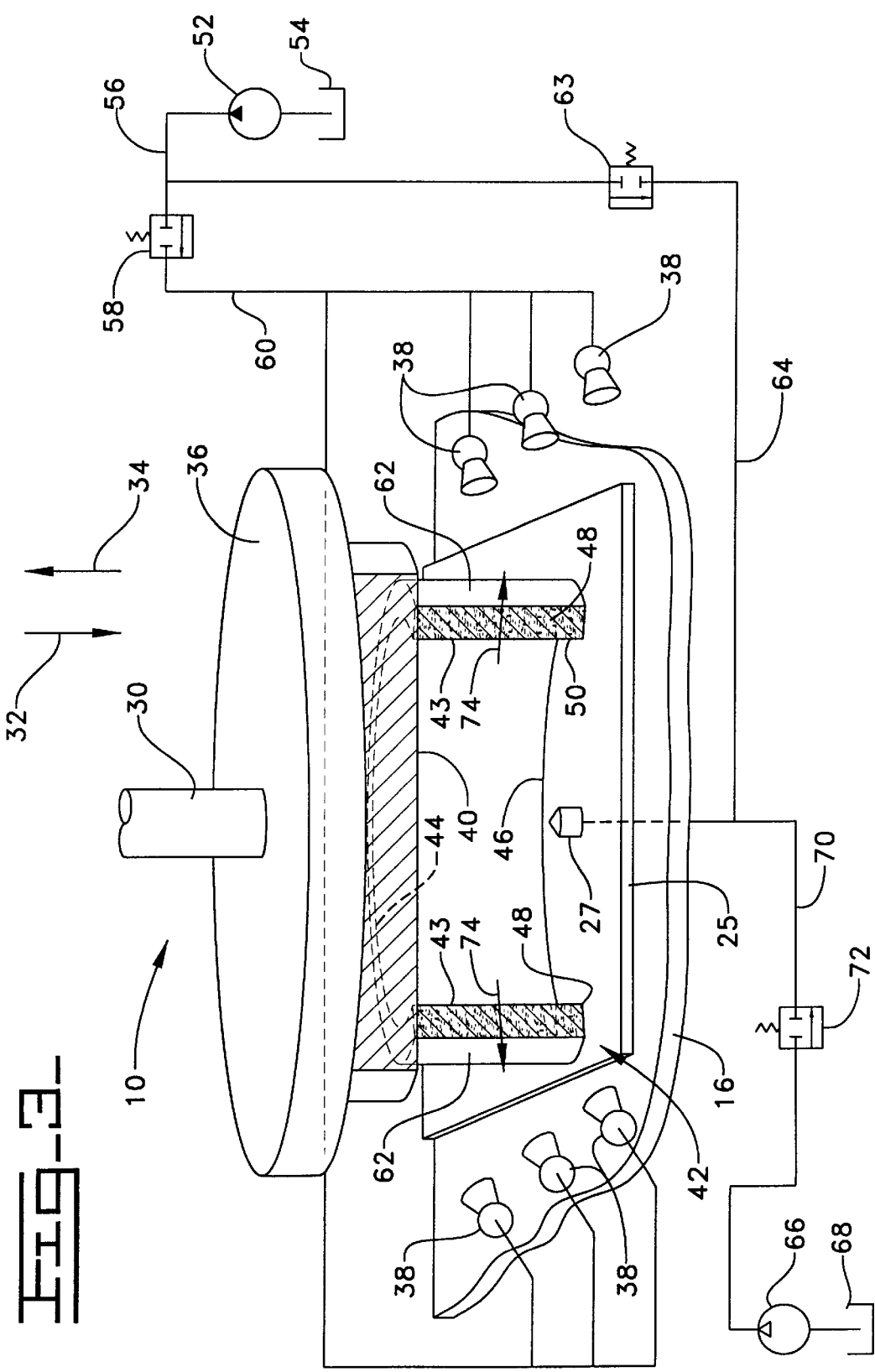
FIG. 3 is an enlarged partial cutaway view, partial schematic view of the cleaning apparatus of FIG. 2.

Referring now to FIG. 3, the cleaning apparatus 10 further includes a pump 52. The pump 52 is operable to draw cleaning fluid from a reservoir 54. Preferably, the cleaning fluid is an emulsifying type cleaner. One such emulsifying type cleaner which may be used with the present invention is commercially available from Houghton International of Valley Forge, Pa. as Cerfa-Kleen 5398. The pump 52 advances pressurized cleaning fluid to a supply line 56. The supply line 56 is in fluid communication with a sprayer valve 58. The sprayer valve 58 is a solenoid actuated valve. When the solenoid of the sprayer valve 58 is actuated, the sprayer valve 58 is placed in an open position (not shown) which allows pressurized cleaning fluid from the supply line 56 to advance to a manifold 60. When the solenoid is deactuated, the sprayer valve 58 is placed in a closed position (shown in FIG. 3) and pressurized cleaning fluid from the supply line 56 is prevented from advancing to the manifold 60. The manifold 60 is in fluid communication with a number of nozzles 38 positioned around the first sealing member 25. It should be appreciated that when cleaning fluid is advanced through the manifold, the cleaning fluid is sprayed through the nozzles 38 against an exterior surface 62 of the bearing sleeve 42.

The supply line 56 is further in fluid communication with an injector valve 63. The injector valve 63 is also a solenoid actuated valve. When the solenoid of the injector valve 63 is actuated, the injector valve 63 is placed in an open position (not shown) which injects pressurized cleaning fluid from the pump 52 to the interior chamber 50 via the interior nozzle 27 and the fluid line 64. When the solenoid is deactuated, the injector valve 63 is placed in a closed position (shown in FIG. 3) which prevents advancement of pressurized cleaning fluid from the pump 52 to the interior nozzle 27 via the fluid line 64. It should be appreciated that when the lower end opening 46 and the upper end opening 44 are sealed, the cleaning fluid injected via the interior nozzle 27 fills the interior chamber 50 with cleaning fluid.

The cleaning apparatus 10 further includes a compressor 66 which draws ambient air from the surrounding environment 68 and advances compressed air to a pneumatic line 70. The cleaning apparatus 10 further includes a pneumatic valve 72 which selectively places the compressor 66 in fluid communication with the interior chamber 50. The pneumatic valve 72 is a solenoid actuated valve. When the solenoid of the pneumatic valve 72 is actuated, the pneumatic valve 72 is placed in an open position (not shown) which advances pressurized air from the compressor 66 to the interior chamber 50 via the pneumatic line 70 and the interior nozzle 27. The compressed air from the interior nozzle 27 pressurizes the interior chamber 50. When the solenoid is deactuated, the pneumatic valve 72 is placed in a closed position (shown in FIG. 3) which prevents advancement of pressurized air from the compressor 66 to the interior chamber 50 via the pneumatic line 70 and the interior nozzle 27.

It should be appreciated that when the interior chamber 50 is filled with cleaning fluid, pressurizing the interior chamber 50 with air from the compressor 66 pushes cleaning fluid from the interior chamber 50, through the porous structure 48, and to the outer surface 62 along a path indicated by arrows 74. As the cleaning fluid passes through the porous structure 48, quench oil is forced out and the cleaning fluid becomes intermixed with residual quench oil left in the porous structure 48. Preferably, the cleaning fluid is an emulsifying cleaner which creates an emulsion of quench oil and cleaning fluid in the porous structure 48. This emulsion is then forced through the porous structure 48 and out to the outer surface 62 by the pressurized air in the interior chamber 50. It should be appreciated that quench oil is removed from the porous structure 48 as the emulsion is forced through the porous structure 48. A portion of the cleaning fluid, quench oil, and emulsion that is forced through the porous structure 48 remains on the outer surface 62 as residual material.

To remove the residual material from the outer surface 62, the cleaning fluid is sprayed through the nozzles 38 toward the outer surface 62 of bearing sleeve 42. In particular, the sprayer valve 58 is positioned in the open position so as to advance cleaning fluid from the pump 52 to the nozzles 38 via the manifold 60. As the cleaning fluid is sprayed against the outer surface 62, the residual material is removed from the outer surface 62 with the flow of cleaning fluid from the nozzles 38. After the quench oil has been removed from the porous structure 48 and outer surface 62 of the bearing sleeve 42, a lubricant, such as a high additive oil, can be impregnated into the porous structure 48. By removing the quench oil prior to impregnating the bearing sleeve with lubricant, a greater quantity of lubricant can be impregnated in the porous structure 48 thereby increasing the effectiveness of the bearing sleeve 42.

INDUSTRIAL APPLICABILITY

In operation, the bearing sleeve 42 is positioned within the cleaning assembly 10. In particular, the bearing sleeve 42 is positioned on the first sealing member 25 such that the first sealing member 25 seals the entire lower end opening 46. The second sealing member 40 is then positioned adjacent the upper end opening 44 so as to seal the upper end opening 44. Specifically, the second sealing member 40 is moved from the upper position (shown in FIG. 1) to the lower position (shown in FIG. 2) so to cause the first sealing member to seal the upper end opening 44 of the bearing sleeve 42. By sealing the upper end opening 44 and the lower end opening 46, the interior chamber 50 is formed within the bearing sleeve 42.

The cleaning fluid is then injected into the interior chamber 50. In particular, the solenoid of the injector valve 63 is actuated thereby placing the injector valve 63 in the open position. The injector valve 63 is held in the open position for a first period of time so as to inject the cleaning fluid from the pump 52 to the interior chamber 50 via the fluid line 64 and the interior nozzle 27. The duration of the first period of time is the period of time needed to fill the interior chamber 50 with the cleaning fluid. At the end of the first period of period of time, the interior chamber 50 is filled with the cleaning fluid.

The pneumatic valve 72 is then placed in the open position for a second period of time. In particular, the solenoid of the pneumatic valve 72 is actuated to place the pneumatic valve 72 in the open position so as to advance pressurized air from the compressor 66 to the interior chamber 50 via the pneumatic line 70 and the interior nozzle 27. It should be appreciated that advancing pressurized air to the interior chamber 50 pressurizes the cleaning fluid within interior chamber 50. The pressurized cleaning fluid is then pushed from the interior chamber 50, through the porous structure 48, and to the outer surface 62 along the path indicated by the arrows 74. As the cleaning fluid passes through the porous structure 48, quench oil is forced out and the cleaning fluid becomes intermixed with residual quench oil left in the porous structure 48 forming an emulsion of quench oil and cleaning fluid. The emulsion is then forced through the porous structure 48 and out to the outer surface 62 by the pressurized air in the interior chamber 50. For the exemplary embodiment, it was found that an air pressure of forty psi applied to the interior chamber 27 for twenty five seconds removes approximately ninety percent of the quench oil from a porous structure 48 having a porosity of about thirty percent.

A portion of the cleaning fluid, quench oil, and emulsion that is forced out of the porous structure 48 with the pressurized air remains on the outer surface 62 as residual material. To remove the residual material from the outer surface 62 of the bearing sleeve 42, the sprayer valve 58 is positioned in the open position so as to advance cleaning fluid through the nozzles 38 against the outer surface 62. In particular, the solenoid of the sprayer valve 58 is actuated so as to position the sprayer valve 58 in the open position. As the cleaning fluid is sprayed against the outer surface 62, the residual material is removed from the outer surface 62 with the flow of cleaning fluid from the nozzles 38.

The cleaned bearing sleeve 42 is then removed from the cleaning assembly 10. First, the second sealing member 40 is moved from the second position (shown in FIG. 2) to the first position (shown in FIG. 1) so as to remove the second sealing member 40 from upper end opening 44 of the bearing sleeve 42. Second, the bearing sleeve 42 is removed from the cleaning assembly 10. Subsequently, lubricant can be impregnated into the porous structure 48. By removing the quench oil from the porous structure 48 prior to impregnating the bearing sleeve 42 with the lubricant, a greater quantity of the lubricant can be impregnated in the porous structure 48 thereby increasing the effectiveness of the bearing sleeve 42.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An apparatus for removing liquid from a permeable metal part, said permeable metal part entraps a quantity of liquid in pores defined therein and defines an upper end opening and a lower end opening, comprising:

a first sealing member which seals said lower end opening;

a second sealing member which seals said upper end opening, said permeable metal part, said first sealing member, and said second sealing member define an closed interior chamber;

a pump operable to inject cleaning fluid into said interior chamber;

a compressor operable to fill said interior chamber with pressurized gas; and a number of nozzles mounted proximate to said exterior of said permeable metal part, wherein:

said pump injects cleaning fluid into said interior chamber;

said compressor pressurizes said interior chamber with said pressurized gas, said cleaning fluid is advanced by said pressurized gas from said interior chamber to an exterior of said permeable metal part via said pores so as to remove said entrapped liquid from said pores;

cleaning fluid is sprayed against said exterior of said permeable metal part via said nozzles; and a residual material is washed away from said exterior of said permeable metal part.

* * * * *